United States Patent [19]

Rigby

[11] Patent Number: 5,388,461

[45] Date of Patent: Feb. 14, 1995

[54] BEAMFORMING TIME DELAY CORRECTION FOR A MULTI-ELEMENT ARRAY ULTRASONIC SCANNER USING BEAMSUM-CHANNEL CORRELATION

[75] Inventor: Kenneth W. Rigby, Clifton Park, N.Y.

[73] Assignee: General Electric Company, Schenectady, N.Y.

[21] Appl. No.: 182,323

[22] Filed: Jan. 18, 1994

[51] Int. Cl.$^6$ ............................................. G01N 29/18
[52] U.S. Cl. ................................... 73/597; 128/660.06
[58] Field of Search ....................... 128/660.06, 660.07, 128/661.01; 73/597, 599, 625

[56] References Cited

U.S. PATENT DOCUMENTS

| | | | |
|---|---|---|---|
| 4,817,614 | 4/1989 | Hassler et al. | 128/660.05 |
| 4,989,143 | 1/1991 | O'Donnell | 364/413.25 |
| 5,172,343 | 12/1992 | O'Donnell | 367/7 |
| 5,224,480 | 7/1993 | Yamada et al. | 128/660.06 |
| 5,235,983 | 8/1993 | Iida et al. | 128/660.07 |

OTHER PUBLICATIONS

S. W. Flax et al., "Phase-Aberration Correction Using Signals From Point Reflectors and Diffuse Scatters: Basic Principles," IEEE Transactions on Ultrasonics, Ferroelectrics and Frequency Control, vol. 35, No. 6, Nov. 1988, pp. 758–767.

Nock et al., "Phase Aberration Correction in Medical Ultrasound Using Speckle Brightness as a Quality Factor", J. Accoust, Soc. AM 85(5), May 1989, pp. 1819–1833.

Attia et al., "Self–Cohering Large Antenna Arrays Using the Spatial Correlation Properties of Radar Clutter", IEEE Transactions on Antennas and Propagation, vol. 37, No. 1, Jan. 1989, pp. 30–38.

Steinberg et al., "Adaptive Beam Forming II", Microwave Imaging Techniques, John Wiley & Sons, Inc., pp. 229–275.

*Primary Examiner*—George Manuel
*Attorney, Agent, or Firm*—Marvin Snyder

[57] ABSTRACT

An ultrasonic imaging system for performing a scan in which beamforming time delay errors due to nonuniformity in sound speed within the transmission medium are corrected employs a multiple channel transmitter and receiver. Time delay errors are measured by cross correlating the channel signal in each respective one of the receiver channels with a reference beamsum signal produced by summing all the receiver channel signals. The resulting time delay corrections are applied to corresponding channels of the transmitter and receiver to offset time delay errors in the subsequent acquisition of image data.

11 Claims, 5 Drawing Sheets

BEAMFORMING TIME DELAY CORRECTION FOR A MULTI-ELEMENT ARRAY ULTRASONIC SCANNER USING BEAMSUM-CHANNEL CORRELATION

BACKGROUND OF THE INVENTION

This invention relates to coherent imaging using vibratory energy, such as ultrasound, and, in particular, to ultrasound imaging which employs multi-element array transducers.

There are a number of methods in which vibratory energy, such as ultrasound, can be used to produce images of objects. The present invention relates to the reflection method for producing ultrasound images in which a single ultrasonic transducer array is used for both transmission and reception of ultrasonic pulses. An image is produced in which the brightness of each pixel is a function of the amplitude of the ultrasound reflected from the object to the receiver.

Ultrasonic transducers for medical applications are constructed from one or more piezoelectric elements sandwiched between a pair of electrodes. When an appropriate voltage pulse is applied, the piezoelectric element emits an ultrasonic pulse into the medium. Conversely, when an ultrasonic pulse strikes the piezoelectric element, the element produces a corresponding voltage across its electrodes. A number of such ultrasonic transducer constructions are disclosed in U.S. Pat. Nos. 4,217,684; 4,425,525; 4,441,503; 4,470,305 and 4,569,231, all of which are assigned to the instant assignee.

When used for ultrasound imaging, the transducer typically has a number of piezoelectric elements arranged in an array and driven with separate voltages. By properly controlling the relative time delays of the applied voltages on each element, the ultrasonic waves produced by the piezoelectric elements can be made to combine to produce a net ultrasonic wave focused at a selected point. This focal point can be moved on each successive transmitter firing, so that the transmitted beams can be scanned across the object without moving the transducer.

Similar principles apply when the transducer is employed to receive the reflected sound. The voltages produced at the transducer elements in the array are individually delayed in time and then summed together such that the net signal is dominated by sound reflected from a single receive focal point in the subject. This summed receiver signal is often called the "beamsum".

For a wave at a single frequency f, it is well known that a shift in time $\Delta t$ is equivalent to a shift in phase $\Delta \phi$ through the relationship $\Delta \phi = 2\pi \phi \Delta t$. The pulses typically used in ultrasound imaging contain a wide range of frequencies, so this equivalence is only approximate. Some ultrasound imaging systems use the approximate equivalence to combine time delays and phase delays to produce the desired focusing on transmit and/or receive. The process of applying time and/or phase delays to produced focused transmit and receive beams is often called "beamforming."

An ultrasound image is formed by making a series of reflection measurements in a set of desired directions. For each measurement, a focused ultrasonic wave is transmitted. Then the system switches to receive mode and the reflected ultrasonic wave is received, focused and stored. When a complete set of scan directions has been obtained, the ultrasound image is constructed and displayed, and the process then repeats for the next imaging frame. A number of such ultrasonic imaging systems are disclosed in U.S. Pat. Nos. 4,155,258; 4,155,260; 4,154,113; 4,155,259; 4,180,790; 4,470,303; 4,662,223; 4,669,314 and 4,809,184, all of which are assigned to the instant assignee.

The proper operation of an ultrasonic imaging system such as just described assumes that there is a known, constant speed of sound in the medium through which the ultrasonic pulses are conveyed. If the sound speed is not constant, sound pulses transmitted from certain elements in the array can arrive earlier or later than expected at the desired focal point and will not properly combine with the other pulses. As a result, the net transmitted wave will not be optimally focused. Similarly, on reception, the signals on each element in the array will not be delayed optimally before summing so that the receive focusing will be degraded. If the deviations from the assumed propagation times could be measured or estimated, the ultrasound image could be improved by correcting the applied time delays for the deviations.

The human body is known to consist of many different tissues with differing sound speeds. Despite this, in medical applications the assumption of constant sound speed produces good images on many patients. However the distribution of the various tissue types varies widely with patients, and some patients are only poorly imaged. The body wall, in particular, which consists of relatively thick muscle and fat layers with sound speeds significantly different from the average sound speeds of the internal organs, can degrade the image for some patients. There would be a substantial medical benefit if the images of these patients could be improved by correcting for nonuniformity in the sound speed in the body. Such time delay corrections may need calculation for each separate transmit-receive direction, since the sound speed nonuniformities may vary significantly with beam direction. The corrections may also require calculation on a real-time basis due to patient and transducer motion in clinical applications. U.S. Pat. No. 4,989,143, assigned to the instant assignee, discloses a method and system for correcting the time delay of the separate signals produced by the transducer array elements to account for sound speed variations. In this prior method the demodulated baseband signals from pairs of adjacent receiver channels are cross correlated over a range of echo samples and a phase error difference between the two channels is calculated. This phase error difference is accumulated across the array and applied as a time delay correction to the corresponding transmit and receive channels. However, under some circumstances, this method does not improve image quality. Specifically, the signals which are cross correlated correspond to ultrasound energy arriving on individual array elements. The individual array elements can have a significant response to reflectors far from the beam direction which is being corrected. The time delay estimates can be corrupted by these off-axis reflectors if the reflectors are sufficiently bright or if the transmit beam is sufficiently defocused. In addition, the accumulation of phase error differences to calculate the time delay corrections also accumulates the inaccuracies in each channel pair measurement, reducing the accuracy and robustness of the corrections.

U.S. Pat. No. 5,172,344, assigned to the instant assignee, also discloses a method and system for correcting the time delay of the separate signals produced by the transducer array elements. In this prior method the demodulated baseband beam signals produced at reference beam angles are cross correlated and the phase errors between the beams are calculated. These phase errors are calculated across the entire field of view and then Fourier transformed to produce time delay corrections which are applied to each transmitter and receiver channel. However, the determination of the time delay errors from the Fourier transform is based on an approximation, and care must be taken, in clinical applications, to avoid large time delay errors or patient motion between beam firings, which can make the approximation invalid.

SUMMARY OF THE INVENTION

The present invention relates to a method and apparatus to correct for focusing degradation in an ultrasound imaging system caused by variations in sound speed within the transmission medium, and particularly to the calculation of correction time delays for each transducer element using acquired beam data. More specifically, the present invention includes a multi-element ultrasonic transducer; a transmitter which applies to the separate transducer elements pulses delayed by amounts necessary to steer an ultrasonic beam in a desired direction; a receiver responsive to each transducer element for providing a separate delay to the echo signal produced by each element to form a receive beam steered in the desired direction; and a time delay correction processor responsive to the receiver and operable to perform a cross correlation between the receive beam data and each separate receiver channel signal in order to measure the time delay error for the transducer element corresponding to that receiver channel. The time delay correction processor produces a set of correction time delay changes that are applied on subsequent transmitter firings for the same beam direction to correct the timing of the pulses applied to the respective transducer elements by the transmitter and which are also applied to correct the delays imposed by the receiver on the echo signals produced by the respective transducer elements.

A general object of the invention is to improve image quality in an ultrasound imaging system by correcting for nonuniformities in sound speed within the transmission medium. A set of time delay correction values is produced for the receiver and the transmitter channels by cross correlating the receiver beamsum data with the echo signal data for each receiver channel. These correction values are used in subsequently acquiring a transmit/receive beam in the desired beam direction.

Another object of the invention is to improve image quality of an ultrasound imaging system by increasing the accuracy of time delay corrections. Rather than calculating time delay error between channel pairs, the time delay error between each channel and a common reference signal is calculated, using the beamsum signal as the reference signal. The receive beamsum signal is dominated by the echo signals reflected from the beam focus and therefore use of the receive beamsum signal effectively restricts to the desired beam direction the angular extent of the echo sources which contribute to the cross correlation measurement, thereby reducing the likelihood that sources away from the desired beam direction will distort the measurement.

Yet another object of the invention is to provide an ultrasound imaging system for producing a robust measurement of time delay error for each transducer channel. By using a common reference beam against which each receive channel signal is cross correlated, the time delay error for each channel is calculated directly and independently. There is no need to accumulate incremental time delay errors to relate the measurement to a reference channel, and thus inaccuracies in one channel measurement are not carried forward to other channels.

A more specific object of the invention is to simplify time delay correction circuitry in an ultrasound imaging system. Because a common reference signal is cross correlated against each receive channel, the number of independent signal busses needed in the system is reduced. Also, by producing absolute time delay error for each channel directly and independently, any need to accumulate incremental time delay error measurements to provide an absolute time delay error for each channel is obviated.

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

DESCRIPTION OF THE PREFERRED EMBODIMENT

Figure 1:
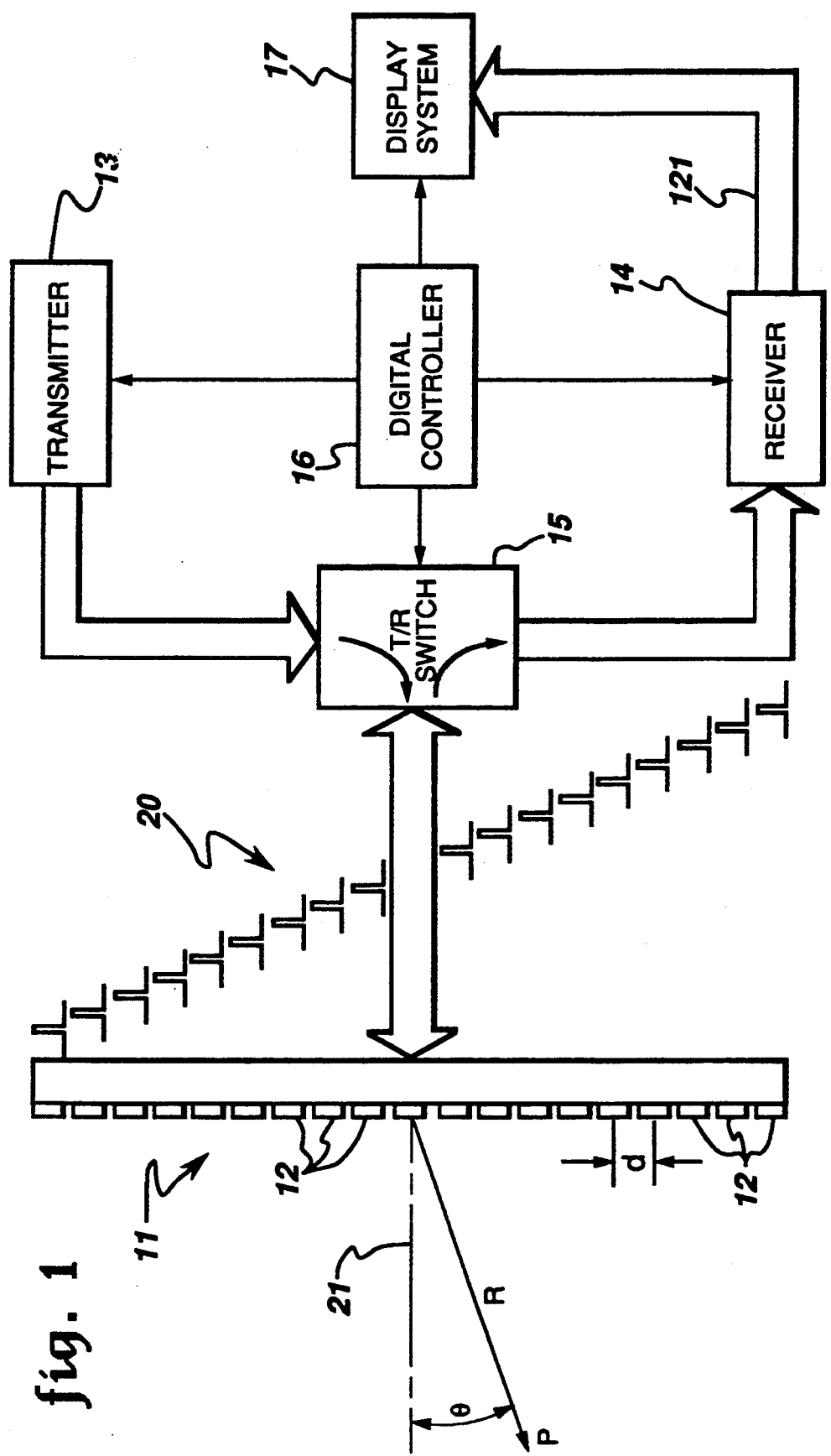
FIG. 1 is a block diagram of an ultrasonic imaging system employing the present invention.

As shown in FIG. 1, a vibratory energy imaging system includes a transducer array 11 comprised of a plurality of separately driven elements 12 which each produce a burst of vibratory energy, such as ultrasonic energy, when energized by a pulse produced by a transmitter 13. The vibratory energy reflected back to transducer array 11 from the subject under study is converted to an electrical signal by each transducer element 12 and applied separately to a receiver 14 through a set of switches 15. Transmitter 13, receiver 14 and switches 15 are operated under control of a digital controller 16 responsive to commands by a human operator. Each scan line in the image is constructed by acquiring a series of echoes in which switches 15 are set to their transmit positions, transmitter 13 is gated on momentarily to energize each transducer element 12, switches 15 are then set to their receive positions, and the subsequent echo signals produced by each transducer element 12 are applied to receiver 14. The separate echo signals from each transducer element 12 are combined in receiver 14 to produce a single echo signal corresponding to a single scan line. A display system 17 receives the series of data samples produced by receiver 14 for all the scan lines and converts the data to a form producing one frame of the desired image.

Transmitter 13 drives transducer array 11 such that the vibratory energy produced (e.g., ultrasonic energy) is directed, or steered, and focused in a beam. A complete scan can therefore be performed by moving this beam through a set of angles $\theta_i$. To accomplish this, transmitter 13 imparts a time delay $T_{t,k}$ (k=1 to N), to the respective pulses 20 that are applied to N transducer elements 12. The time delays $T_{t,k}$ are chosen so that the pulses from each transducer element will arrive at the desired transmit focus point (R,$\theta_i$) simultaneously:

$$T_{t,k} = -(D_{t,k} - D_{t,o})/c + T_{t,o} - T_{c,k}. \tag{1}$$

Here $D_{t,k}$ element is the distance from the desired transmit focus point to the $k^{th}$ element in the transmitter, $D_{t,o}$ is the distance from the desired transmit focus point to the center of the transducer, and c is the assumed sound speed in the medium. $T_{t,o}$ is an offset time delay added to ensure that all the time delays $T_{t,k}$ are positive values. $T_{c,k}$ is a time delay correction calculated by the time delay correction circuitry for each element to account for nonuniformities in the transmission medium, as described below.

Figure 2:
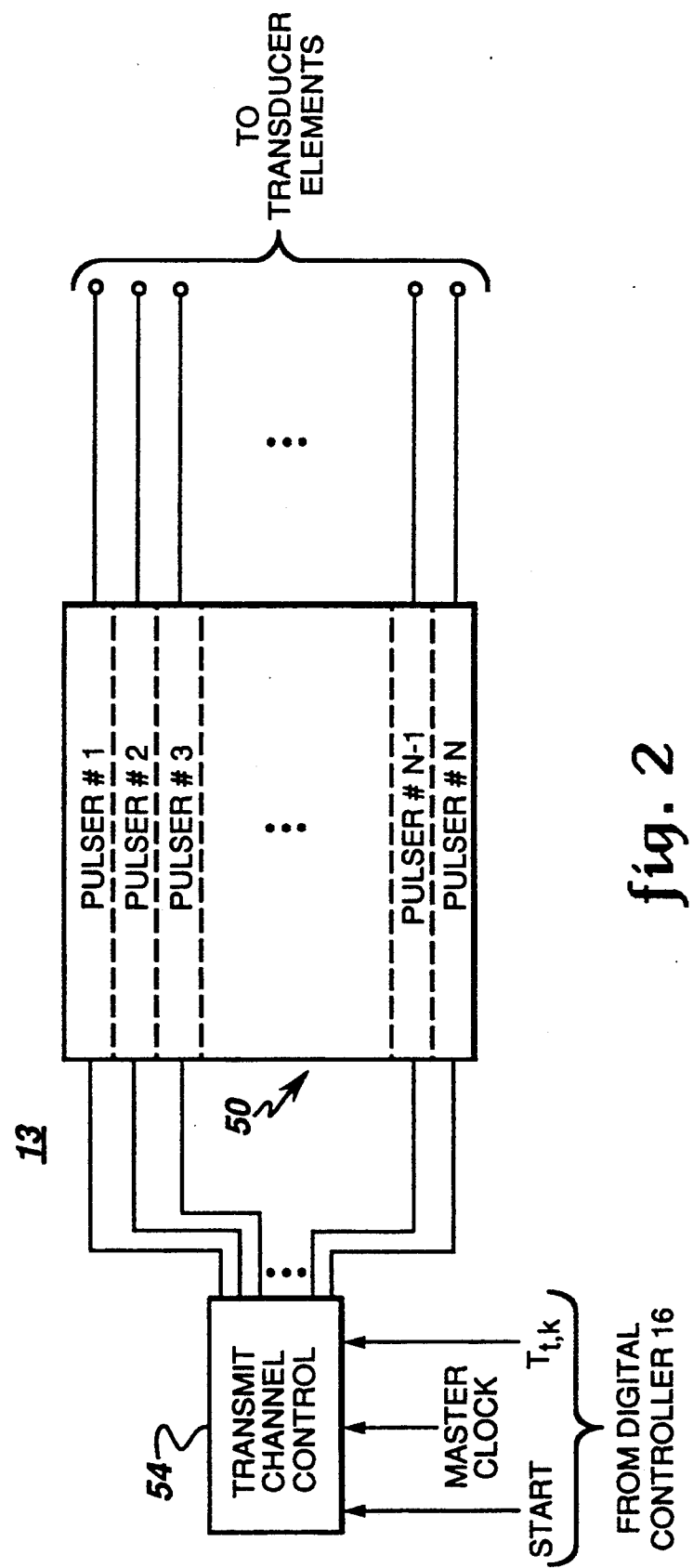
FIG. 2 is a block diagram of a transmitter which forms part of the system of FIG. 1.

As shown in FIG. 2, transmitter 13 is comprised of two sections, a transmit channel control section 54 and pulsers 50. The transmit channel control receives from digital controller 16, shown in FIG. 1, two control signals, START and MASTER CLOCK, and the transmit time delays $T_{t,k}$. Using the MASTER CLOCK signal as the timing reference, the transmit channel control generates a timing signal for each of pulsers 50 at the respective times $T_{t,k}$ after reception of the START signal, which signals the beginning of a single transmit/receive beam cycle. Upon reception of its respective timing signal, each pulser generates an electrical pulse which is conveyed to the corresponding transducer element through T/R switch 15, shown in FIG. 1. The transducer element converts the electrical pulse into an ultrasonic pulse.

For proper functioning of the time delay correction circuitry described below, an essential feature of the transmitter is that it produces a voltage pulse for each transducer element at a specifiable time. For a detailed description of transmitter 13, reference is made to commonly assigned U.S. Pat. No. 5,014,712 issued on May 14, 1991, and entitled "Coded Excitation For Transmission Dynamic Focusing of Vibratory Energy Beam", incorporated herein by reference.

The echo signals produced by each burst of ultrasonic energy emanate from reflecting objects located at successive positions along the scan line direction. These are sensed separately by each element 12 of transducer array 11 shown in FIG. 1. Receiver 14, shown in FIG. 1, amplifies these separate echo signals, imparts the proper time delay to each and sums them together to provide a single echo signal which accurately indicates the total ultrasonic energy reflected from the receive focal point P, shown in FIG. 1. The time delays for the receiver are calculated as for the transmitter by taking into account the propagation time from the focal point to each transducer element:

$$T_{r,k} = (D_{r,k} - D_{r,o})/c + T_{t,o} + T_{r,o} + T_{c,k}. \tag{2}$$

Here $D_{r,k}$ is the distance from the desired receive focus point to element k in transducer 11, and $D_{r,o}$ is the distance from the desired receive focus point to the center of transducer 11. $T_{r,o}$ is an offset time delay added to ensure that all the receive time delays $T_{r,k}$ are positive values. $T_{t,o}$ is the transmit offset time and $T_{c,k}$ is the time delay correction used in equation (1).

The receive time delays can be adjusted dynamically to increase the depth of the focal point as the echoes are received from progressively larger ranges after a single transmit firing. To simplify the circuitry required to calculate these times delays dynamically, various approximations to the distances ($D_{r,k}-D_{r,o}$), well known to those skilled in the art, can be used.

Figure 3:
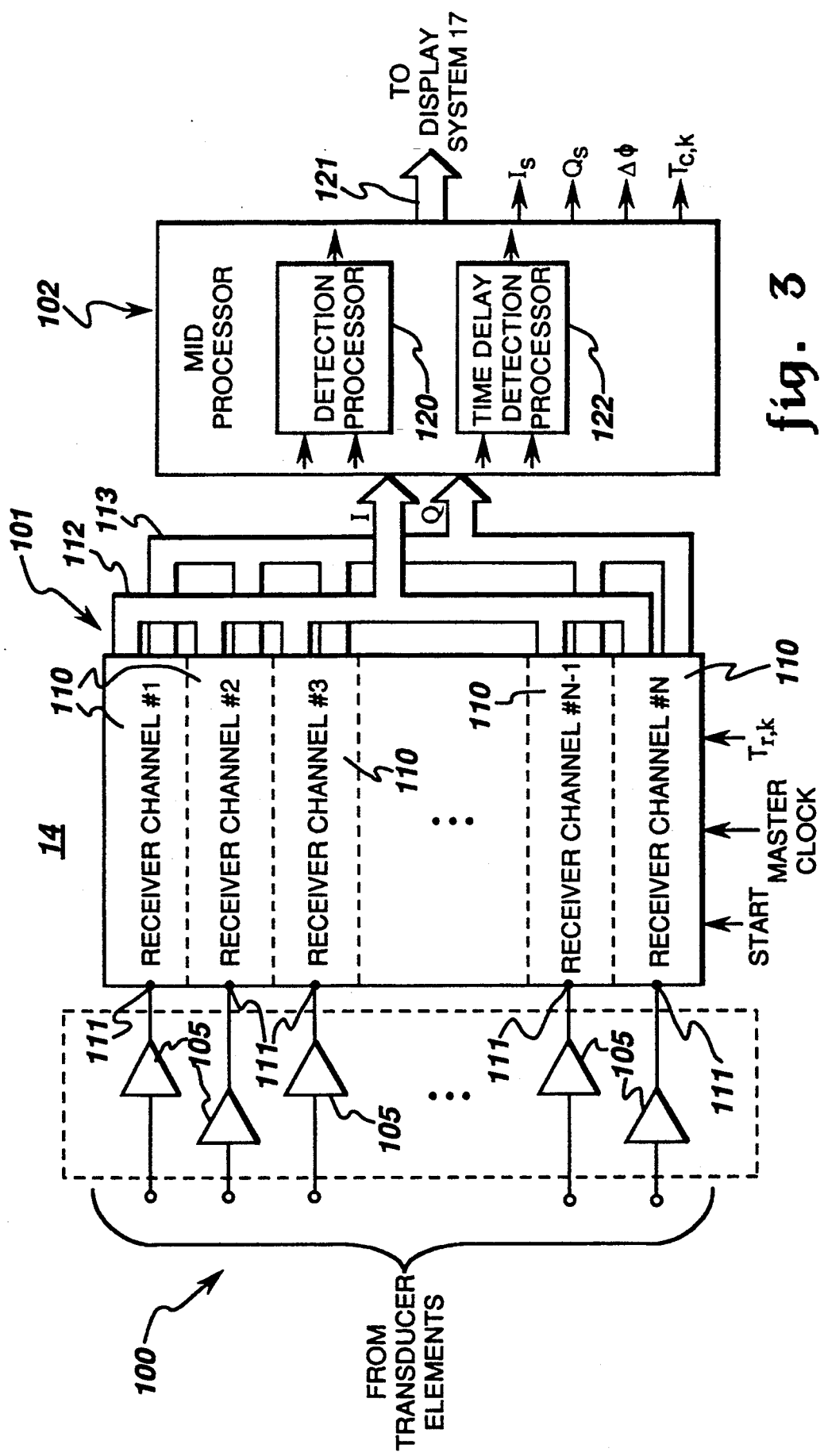
FIG. 3 is a block diagram of a receiver which forms part of the system of FIG. 1.

As shown in FIG. 3, receiver 14 is comprised of three sections: an amplifier section 100, a receive beamforming section 101 and a mid-processor 102. Each transducer element 12, shown in FIG. 1, is connected through T/R switch 15, shown in FIG. 1, to an amplifier 105 which amplifies the echo signal received by the transducer element. The amplified signal from each amplifier is applied to a receiver channel 110. Each receiver channel receives from digital controller 16, shown in FIG. 1, two control signals, START and MASTER CLOCK, and the corresponding receive time delay $T_{r,k}$. Each receiver channel samples and demodulates the analog echo signal from the amplifier, producing a stream of digital output values on an I bus 112 and a Q bus 113. The I and Q signals applied to the buses are digital numbers representing the in-phase and quadrature components of the demodulated echo signal. Using the MASTER CLOCK signal, these samples are delayed by the receiver channels by the corresponding time delays $T_{r,k}$ with respect to the START signal, which signals the beginning of a single transmit/receive beam cycle.

For proper functioning of the time delay correction circuitry described below, an essential feature of the receiver is that it produces for each transducer element the demodulated digital signals I and Q delayed by a specifiable time. For a more detailed description of receiver 14, reference is made to U.S. Pat. No. 4,983,970 issued on Jan. 8, 1991 and entitled "Method And Apparatus for Digital Phase Array Imaging", and which is incorporated herein by reference.

Mid-processor section 102 sums the receive channel echo signal samples, which are obtained from I and Q buses 112 and 113, to produce beamsum signal samples. Mid-processor 102 can perform a variety of calculations on these beam samples. For example, a detection processor 120 is implemented in which a digital magnitude M is calculated from each beamsum sample and produced at mid-processor output 121 according to $$M = \sqrt{I^2 + Q^2}. \tag{3}$$

This magnitude data is converted to the desired form and displayed to the operator as an image on display system 17, shown in FIG. 1.

It can be appreciated that calculations according to equations (1) and (2) with the terms $T_{c,k}$ omitted will produce transmit and receive time delays that are correct only if the sound travels at a uniform speed c throughout the sound propagating medium. The present invention measures errors in the arrival times of echoes on each element and produces the time delay corrections $T_{c,k}$ which are then used to correct the transmit and receive time delays.

Figure 4:
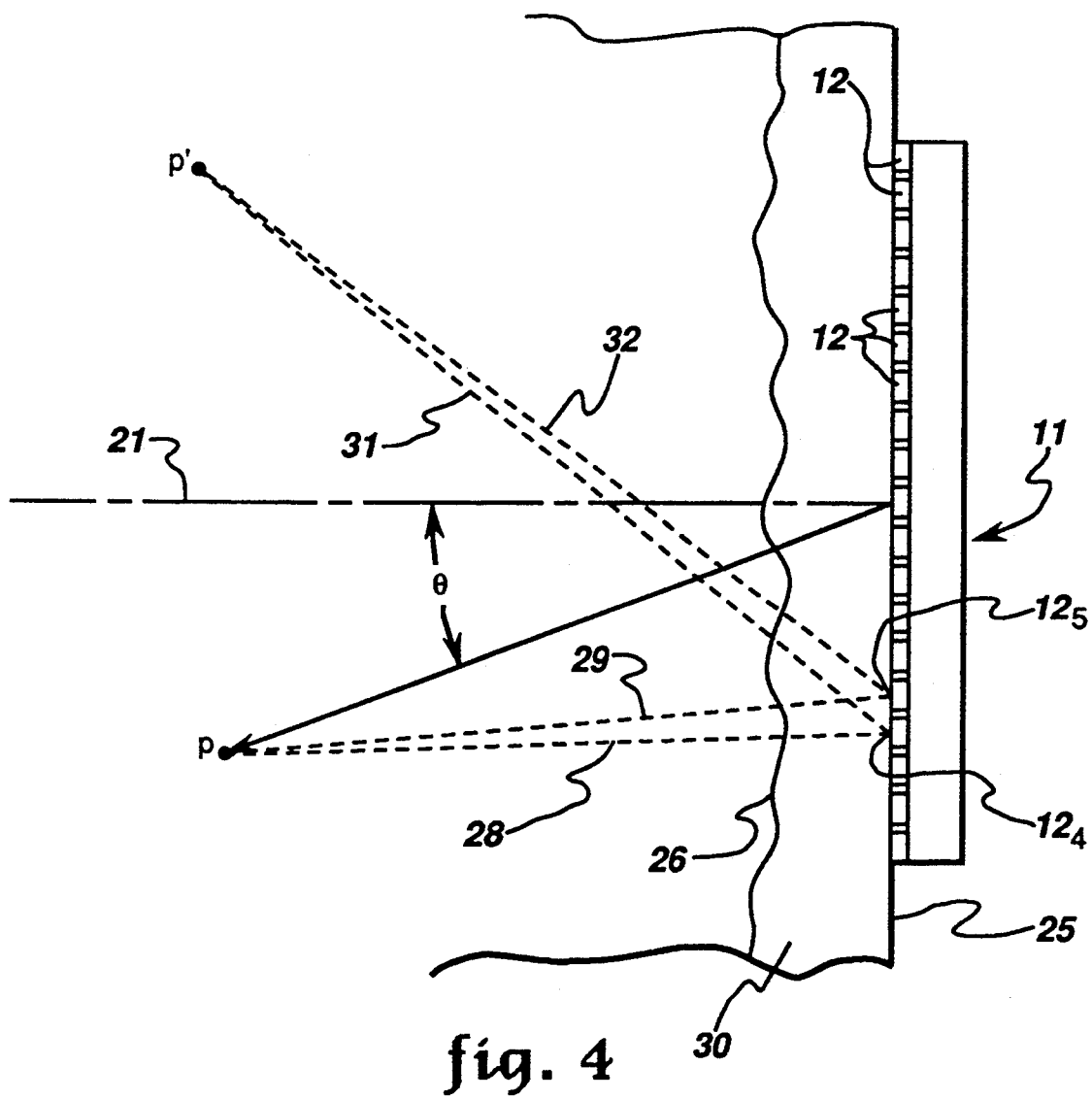
FIG. 4 is a schematic representation of the ultrasonic transducer used in the system of FIG. 1 which illustrates the effect of nonuniformities in the sound transmission medium.

In clinical applications the assumption of uniform sound propagation speed can be invalid for some patients. As shown in FIG. 4, ultrasonic transducer 11 is typically placed on the patient's skin 25. Sound transmitted into and received from the region of interest passes through one or more layers of tissue which have different sound propagation properties, and in particular, different sound transmission speeds. The presence of tissue layers with sound transmission speeds other than that assumed for equations (1) and (2) causes an error in the calculation of the transmit and receive delays. If this error is the same for each transducer element, degradation of the transmit and receive focus is relatively small. However, when the layers have irregular boundaries, the time delay error can vary from element to element, resulting in substantial degradation of the transmit and receive focusing.

Consider as an example the case shown in FIG. 4 in which a boundary 26 between two tissue layers is irregularly shaped. When beam samples are being acquired from point P at steering angle $\theta$, sound conveyed between point P and two separate array elements $12_4$ and $12_5$ is propagated quite differently due to the irregularity of boundary 26. This is illustrated by the respective dashed lines 28 and 29 which reveal that the ultrasound path length in tissue layer 30 is longer for transducer element $12_5$ than for transducer element $12_4$. This difference in path length within tissue layer 30 extending to the two transducer elements $12_4$ and $12_5$ causes a different error in the calculated transmit and receive time delays for these two elements. The same tissue layer may or may not cause an element-dependent time delay error for other transducer elements 12, and the same tissue layer may or may not cause an element-dependent time delay error for the same elements $12_4$ and $12_5$ at different steering angles $\theta$. This is illustrated by the sound paths 31 and 32 to a point P' which have very similar lengths of path within tissue layer 30. Thus in general the time delay errors caused by nonuniformities in the sound propagating medium are different for each transducer element 12 and for each beam direction $\theta_i$ acquired during the scan.

FIG. 3 shows the present invention implemented in large part by a time delay correction processor 122 contained in mid-processor 102. Time delay correction processor 122 receives the I and Q components of the beamsum samples and the I and Q components of the samples from each receiver channel and, from these components, calculates time delay correction values $T_{c,k}$, as described in detail below. These values are supplied to digital controller 16, shown in FIG. 1, which recalculates the transmit time delays $T_{t,k}$ and the receive time delays $T_{r,k}$ for use in subsequent transmit/receive beam cycles.

Figure 5:
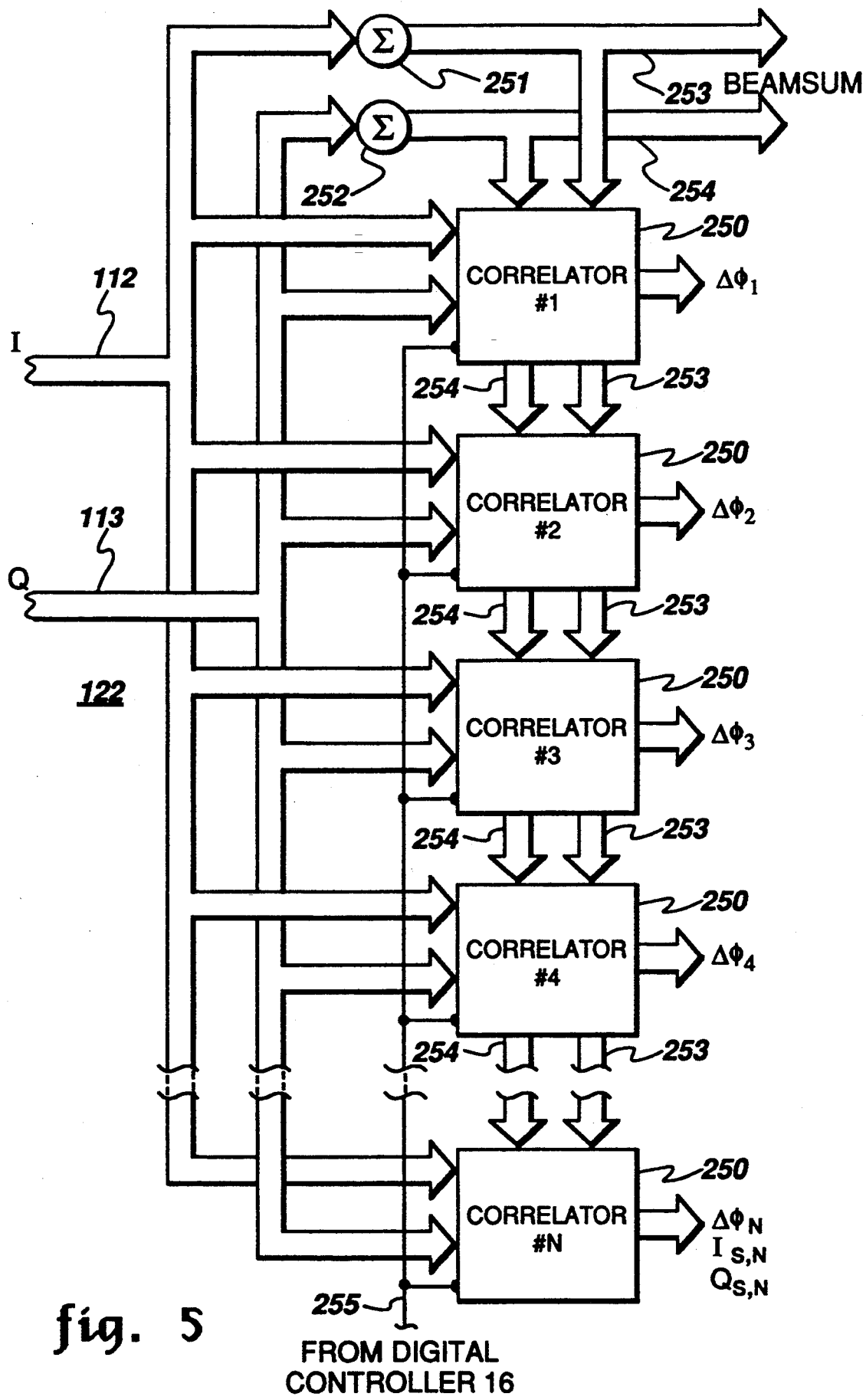
FIG. 5 is a block diagram of a preferred embodiment of the time delay correction processor which forms part of the receiver of FIG. 3.

As shown in FIG. 5, viewed in conjunction with FIG. 3, the I and Q output signals of each channel receiver 110 are conveyed through respective buses 112 and 113 to a corresponding set of correlator circuits 250 in time delay correction processor 122. These I and Q output signals are also applied to respective summing circuits 251 and 252 where the signals are arithmetically added together to form the I and Q components of a beamsum signal on respective buses 253 and 254. As indicated above, the I and Q components of this beamsum signal are employed to calculate magnitude values which determine the brightness of image pixels displayed for specific locations $(R, \theta_i)$. Advantageously, this same beamsum signal is also employed as a reference signal with which each of the receive channel signals is cross correlated.

Each correlator 250 receives the I and Q beamsum signal on buses, the I and Q channel signals for its corresponding channel, and a control signal applied through a control line 255. When the correlator circuits are enabled through control line 255, they each perform a cross correlation between the beamsum signal and the particular receive channel signal. Control line 255 is driven by digital controller 16, shown in FIG. 1, which enables correlators 250 over an averaging interval. This averaging interval is controlled by the operator who selects an interval by positioning range gates on the image that mark the ranges over which time delay data is to be acquired. Typically, the operator would select a span of ranges that avoids including strong reflectors in the averaging interval, for reasons that will become apparent below.

Figure 6:
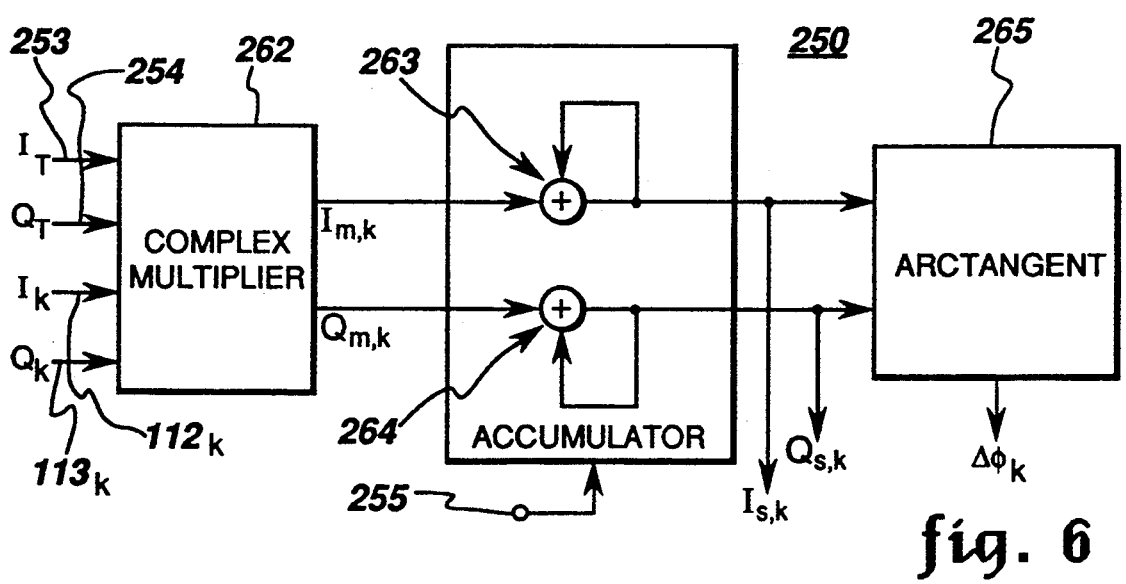
FIG. 6 is a block diagram of a cross correlator circuit which forms part of the time delay correction processor of FIG. 5.

The $k^{th}$ correlator 250, shown in FIG. 6, receives the I and Q components of each complex beamsum signal $S_T(t) = I_T(t) + jQ_T(t)$ on buses 253 and 254, respectively, and the I and Q components of the $k^{th}$ receiver channel signal $S_k(t) = I_k(t) + jQ_k(t)$ on buses $112_k$ and $113_k$, respectively. The argument t is used here to label the discrete set of samples, one for each range, produced by the receiver channels. A complex multiplier section 262 performs, sample by sample, a complex multiplication on the complex conjugate of the receiver channel signal and the beamsum signal:

$$\begin{aligned} S^*_k(t) \, S_T(t) &= (I_k - jQ_k)(I_T + jQ_T) \\ &= (I_k I_T + Q_k Q_T) + j(I_k Q_T - Q_k I_T) \\ &= I_{m,k}(t) + jQ_{m,k}(t) \end{aligned} \quad (4)$$

The I and Q output signals $I_{m,k}$ and $Q_{m,k}$ of complex multiplier section 262 are individually accumulated in their respective accumulators 263 and 264 to produce the I and Q correlation sum output signals of the accumulator $I_{s,k}$ and $Q_{s,k}$, respectively:

$$I_{s,k} = \sum_{t=t_1}^{t_2} I_{m,k}(t) \quad (5)$$

$$Q_{s,k} = \sum_{t=t_1}^{t_2} Q_{m,k}(t)$$

The range of samples $t = t_1$ through $t = t_2$ over which these accumulations are performed is controlled by the signal on control line 255. The correlation sums $I_{s,k}$ and $Q_{s,k}$ are each single digital numbers, not data streams.

At the conclusion of the averaging time interval $(t = t_2)$, the correlation sum output signals of accumulators 263 and 264 are applied to an arctangent computer 265 which calculates the phase angle $\Delta\phi_k$ of the correlation sums $I_{s,k}$ and $Q_{s,k}$ considered as a complex number $S_{s,k} = I_{s,k} + jQ_{s,k}$. The phase angle $\Delta\phi_k$ is an estimate of the weighted average phase difference between the two complex signals $S_k$ and $S_T$, where the averaging is over the samples $t = t_1$ through $t = t_2$, and the phases are weighted by the product of the amplitudes of the two signals. This can be seen by writing the two signals in polar-magnitude form, $$S_T(t) = A_T(t) \exp[j\phi_T(t)]$$

and $$S_k(t) = A_k(t) \exp[j\phi_k(t)].$$

Then the correlation sums can be written as $$S_{s,k} = \sum_{t=t_1}^{t_2} S^*_k S_T = \sum_{t=t_1}^{t_2} A_k A_T \exp[j(\phi_T - \phi_k)]. \quad (6)$$

By avoiding bright reflectors in the averaging interval, as mentioned above, the operator avoids allowing a small number of samples from dominating the correlation sums.

For a more detailed description of cross correlation circuitry which will perform the functions of correlator 250 and is suited for implementation in integrated circuit form, reference is made to commonly assigned U.S. Pat. No. 4,937,775 entitled "*Apparatus For The Cross-Correlation Of A Pair Of Complex Sampled Signals*", which is incorporated herein by reference.

The three output signals $I_{s,k}$, $Q_{s,k}$ and $\Delta\phi_k$, (k=1 to N) of the correlator for each channel are received by digital controller 16 (FIG. 1). Because time delay correction processor 122 (FIG. 5) is controlled by a digital controller, there is great flexibility in the mode of operation of calculating and applying the time delay corrections. In its simplest mode of operation, the time delay correction processor produces time delay corrections independently for each transmit/receive channel and for each beam direction. Alternatively, filtering operations can be performed in the digital controller before applying the time delay corrections to the transmit and receive time delays in order to improve the quality and robustness of the time delay correction estimates. The filtering on the time delay correction estimates can be across the estimates for each transmit/receive channel on a given beam direction, or across each beam direction for a given channel, or most generally, across both channels and beam directions.

When no filtering is desired, only the phase corrections $\Delta\phi_k$ are required. Data are first acquired for a particular beam direction with the time delay corrections $T_{c,k}$ initialized to zero in calculating the transmit and receive time delays, equations (1) and (2). The measured phase corrections $\Delta\phi_k$ obtained from this firing are converted to time delay corrections $T_{c,k}$ using the relationship between phase and time described above, so that $T_{c,k} = \Delta\phi_k/(2\pi f)$, where f is the center frequency of the ultrasound imaging pulse. These time delay corrections $T_{c,k}$ are used to adjust the transmit and receive time delays for the next firing for this beam direction. This next firing produces a new set of time delays corrections. This process of iteratively improving the transmit and receive time delays continues for this beam direction, and similarly for all the beam directions, until the corrections are again reset to zero as desired by the operator.

The correlator sums $I_{s,k}$ and $Q_{s,k}$ are used by digital controller 16 (FIG. 1) when filtering of the time delay estimates is desired. In this case, the correlation sums $S_{s,k} = I_{s,k} + jQ_{s,k}$, one for each channel and beam, are filtered over channels and/or over beam directions to produce a new set of filtered correlation sums $S'_{s,k}$. The phase angles $S\alpha\phi_k$, are calculated from the filtered correlation sums $S'_{s,k}$, and converted to time delays, as before. The filtering improves the time delay estimates by reducing the effects of random errors in the measurements. The use of the digital controller permits a wide variety of filters to be implemented without changing the system circuitry. For example, a filter with M uniform weights applied across the channels on a given beam is equivalent to performing the correlation between the beamsum reference signal and the signal produced by a sub-aperture of the entire transducer array containing M elements.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A coherent vibratory energy beam imaging system which corrects for nonuniformities in propagation speed of a transmission medium for said beam, comprising:

a transducer array having a set of array elements disposed in a pattern, each of said elements being separately operable to produce a pulse of vibratory energy during a transmission mode and to produce an echo signal in response to vibratory energy impinging thereon during a receive mode;

a transmitter coupled to said transducer array and being operable during the transmission mode to apply a separate transmit signal pulse with a respective transmitter time delay $T_{t,k}$ to each of said array elements such that a directed transmit beam is produced;

a receiver coupled to said transducer array and being operable during the receive mode to sample the echo signal produced by each of said array elements as the vibratory energy impinges thereon and to impose a separate respective receiver time delay $T_{r,k}$ on each said echo signal sample such that a directed receive beam may be produced; and correction means responsive to said receiver for producing time delay corrections $T_{c,k}$ for application to said transmitter to correct the transmitter time delays $T_{t,k}$ of the transmit signal pulse applied to each array element in the transducer array, and for application to said receiver to correct the receiver time delays $T_{r,k}$ imposed on each said echo signal sample.

2. The coherent vibratory energy beam imaging system of claim 1 wherein said correction means includes a time delay correction processor for producing said time delay corrections $T_{c,k}$ and a digital controller responsive to said time delay correction processor for producing said transmitter time delays $T_{t,k}$ and said receiver time delays $T_{r,k}$ in response to said time delay corrections $T_{c,k}$.

3. The coherent vibratory energy beam imaging system of claim 2 wherein said receiver includes a plurality N of receiver channels and said time delay correction processor comprises a plurality N of correlators coupled to said receiver channels such that an output of each one of said receiver channels is coupled to a respective one of said correlators, and summation means coupled to each one of said receiver channels for arithmetically summing output signals produced by said channels so as to form a beamsum signal, said summation means being coupled to each of said correlators so as to provide said beamsum signal thereto.

4. The coherent vibratory energy beam imaging system of claim 3 including control means coupled to each of said correlators for enabling said correlators over an averaging interval.

5. The coherent vibratory energy beam imaging system of claim 4 wherein said control means is adapted to enable said correlators over an averaging interval selected to impose propagation range limits on said vibratory energy.

6. The coherent vibratory energy beam imaging system of claim 3 wherein each of said correlators comprises complex multiplier means coupled to a separate respective one of said receiver channels for performing, sample by sample, a complex multiplication on the beamsum signal and on a complex conjugate of the output signal produced by said separate respective one of said receiver channels, accumulator means for accumulating as correlation sums the complex output signals of said complex multiplier means, and arctangent computer means for producing a phase angle output signal for the correlation sums in said accumulator means, said system further including means coupling the outputs of each of said multiplier means and said arctangent computer means to said digital controller.

7. The coherent vibratory energy imaging system recited in claim 4 wherein the vibratory energy comprises ultrasonic energy and each of said transducers comprises an ultrasonic transducer.

8. In an ultrasonic imaging system, a method of correcting for nonuniformities in propagation speed of a transmission medium for said beam, comprising:
   energizing an array of ultrasonic transducer elements disposed in a pattern, each of said array elements being separately operable in response to a separate transmit signal pulse with a respective transmitter time delay $T_{t,k}$ applied respectively thereto during a transmission mode such that a directionally-steered transmit beam is produced, each of said array elements further being separately operable to produce an echo signal in response to ultrasonic energy impinging thereon respectively during a receive mode;
   sampling the echo signal produced by each of said array elements through a separate respective receiver channel as the ultrasonic energy impinges thereon;
   separately delaying each respective array element echo signal sample by a respective receiver time delay $T_{r,k}$ so as to form a directed receive beam for use in producing an image;
   summing the separately delayed array element echo signal samples to form a reference beamsum signal; and
   cross correlating the reference beamsum signal with each separately delayed array element echo signal sample so as to produce a time delay correction $T_{c,k}$ for said each array element.

9. The method of claim 8 including the steps of:
   altering, in response to said time delay correction $T_{c,k}$ for said each array element, the respective transmitter time delay $T_{t,k}$ of the separate signal pulse applied, respectively, to said each array element when the directionally-steered transmit beam is produced; and
   altering, in response to said time delay correction $T_{c,k}$ for said each array element, the separate respective receiver time delay $T_{r,k}$ imposed on said each respective array element echo signal sample.

10. The method of claim 8 wherein the beamsum signal comprises a complex signal and said echo signal sample comprises a complex signal, and wherein each cross correlation is performed by:
   multiplying the beamsum signal by complex conjugate of the separately delayed array element echo signal sample to produce a complex product; and
   summing the product over an averaging time interval to produce a complex correlation sum.

11. The method of claim 10 wherein each time delay correction $T_{c,k}$ is produced by:
   filtering the complex correlation sum produced for each individual receiver channel and each individual beam direction over one of the group consisting of receiver channels, beam directions, and both receiver channels and beam directions, to produce filtered complex correlation sums;
   calculating phase of each said filtered complex correlation sums; and
   dividing each calculated phase by $2\pi$ times an ultrasound imaging pulse center frequency to produce the time delay corrections $T_{c,k}$ for each individual receive channel and each individual beam direction.

* * * * *

UNITED STATES PATENT AND TRADEMARK OFFICE

PATENT NO. : 5,388,461

DATED : Feb. 14, 1995

INVENTOR(S) : Kenneth W. Rigby

It is certified that error appears in the above-identified patent and that said Letters Patent is hereby corrected as shown below:

Col. 1, line 53, change "$\Delta\phi = 2\pi\phi\Delta t$" to -- $\Delta\phi = 2\pi f \Delta t$ --

Col. 5, line 16, delete "element"

Col. 9, line 44, insert a space between "$\Delta\phi_k$" and "obtained"

Col. 9, line 63, delete "Sa$\phi_k$" and substitute -- $\Delta\phi'_k$ --

Col. 10,
Claim 1, line 28, change "Tt,k" to -- $T_{t,k}$ --

Col. 10,
Claim 1, line 36, change "Tr,k" to -- $T_{r,k}$ --

Signed and Sealed this

First Day of August, 1995

BRUCE LEHMAN

*Attest:*

*Attesting Officer*  *Commissioner of Patents and Trademarks*